(12) United States Patent
Bachmann et al.

(10) Patent No.: US 10,469,000 B2
(45) Date of Patent: Nov. 5, 2019

(54) SYNCHRONOUS MACHINE MODULE, VEHICLE DRIVE AND VEHICLE

(71) Applicant: SIEMENS AKTIENGESELLSCHAFT, München (DE)

(72) Inventors: Christian Bachmann, München (DE); Dominik Bergmann, Sachsenkam (DE); Marco Cyriacks, München (DE); Guillaume Pais, München (DE); Lason Vittorias, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/763,394

(22) PCT Filed: Sep. 23, 2016

(86) PCT No.: PCT/EP2016/072708
§ 371 (c)(1),
(2) Date: Mar. 26, 2018

(87) PCT Pub. No.: WO2017/055188
PCT Pub. Date: Apr. 6, 2017

(65) Prior Publication Data
US 2018/0278184 A1 Sep. 27, 2018

(30) Foreign Application Priority Data

Sep. 28, 2015 (DE) .......................... 10 2015 218 567

(51) Int. Cl.
*H02P 6/06* (2006.01)
*H02P 1/04* (2006.01)
(Continued)

(52) U.S. Cl.
CPC ................ *H02P 6/06* (2013.01); *B64D 27/04* (2013.01); *B64D 27/24* (2013.01); *F02B 53/02* (2013.01);
(Continued)

(58) Field of Classification Search
CPC ...... H02P 1/00; H02P 1/42; H02P 1/24; H02P 1/04; H02P 1/26; H02P 1/46; H02P 1/465;
(Continued)

(56) References Cited

U.S. PATENT DOCUMENTS 4,982,147 A * 1/1991 Lauw .................... H02P 25/024
318/721
5,729,118 A * 3/1998 Yanagisawa ............ H02P 9/007
322/29
(Continued)

FOREIGN PATENT DOCUMENTS

DE 69623888 T2 1/2003
WO 9908358 A1 2/1999

OTHER PUBLICATIONS

PCT International Search Report and Written Opinion of the International Searching Authority dated Jan. 17, 2017, for corresponding PCT/EP2016/072708.
(Continued)

*Primary Examiner* — Antony M Paul
(74) *Attorney, Agent, or Firm* — Lempia Summerfield Katz LLC

(57) ABSTRACT

The synchronous machine module includes a synchronous machine and a rotational speed controller for controlling a rotational speed of the synchronous machine, which rotational speed controller has a detector for detecting a variable which is formed by the effective power or is dependent thereon. The rotational speed controller is designed to set the rotational speed of the synchronous machine and/or the time profile thereof as a function of the detected variable and/or its time profile. The vehicle drive has such a synchronous machine module and a power generator, which in order to supply the synchronous machine module is connected
(Continued)

thereto. The vehicle is, in particular, an aircraft and has such a vehicle drive and/or such a synchronous machine module.

16 Claims, 1 Drawing Sheet

(51) Int. Cl.
  *H02P 23/20* (2016.01)
  *H02P 25/024* (2016.01)
  *B64D 27/04* (2006.01)
  *B64D 27/24* (2006.01)
  *F02B 53/02* (2006.01)
  *H02P 9/00* (2006.01)
  *B64D 27/02* (2006.01)
  *F02B 53/00* (2006.01)

(52) U.S. Cl.
  CPC .............. *H02P 1/04* (2013.01); *H02P 23/20* (2016.02); *H02P 25/024* (2016.02); *B64D 2027/026* (2013.01); *F02B 2053/005* (2013.01); *H02P 9/00* (2013.01)

(58) Field of Classification Search
  CPC ...... H02P 1/50; H02P 4/00; H02P 6/00; H02P 6/005; H02P 6/04; H02P 6/06; H02P 6/08; H02P 7/2825; H02P 9/00; H02P 21/00; H02P 21/0003; H02P 21/0085; H02P 23/0081; H02P 25/021; H02P 27/04; H02P 27/06; H02M 5/272; H02M 2005/00
  USPC ......... 318/400.01, 400.02, 400.14, 700, 701, 318/727, 779, 799, 800, 801, 430, 437
  See application file for complete search history.

(56) References Cited

U.S. PATENT DOCUMENTS 5,798,631 A * 8/1998 Spee .................... F03D 7/0272
 290/31
5,877,606 A 3/1999 Nozari
9,174,741 B2 * 11/2015 Suntharalingam ..... B64D 27/02

OTHER PUBLICATIONS

Malinowski, Mariusz, Marian P. Kazmierkowski, and Andrzej M. Trzynadlowski. "A comparative study of control techniques for PWM rectifiers in AC adjustable speed drives." IEEE Transactions on power electronics 18.6 (2003): 1390-1396.
Heins, James F. "The development of an advanced, lightweight 60 kW engine-generator system." IEEE Transactions on Aerospace and Electronic Systems 4 (1966): 125-129.

* cited by examiner

SYNCHRONOUS MACHINE MODULE, VEHICLE DRIVE AND VEHICLE

RELATED CASES

The present patent document is a § 371 nationalization of PCT Application Serial Number PCT/EP2016/072708, filed Sep. 23, 2016, designating the United States, which claims priority to German Patent Application Serial No. DE 10 2015 218 567.2, filed Sep. 28, 2015, which are hereby incorporated by reference.

BACKGROUND

Hybrid-electric drives are currently used in many fields. In particular, internal combustion engines and generators are combined with one another for the purpose of generating electricity. In this case, the generator is intended to be designed in the simplest manner possible and to be as compact and robust as possible.

Permanent-magnet synchronous machines (PMSMs) appear to be particularly suitable for hybrid-electric drives on account of their high power density. However, precise determination of the rotor position is required for efficient operation.

To determine the rotor position, inductive rotary encoders, so-called resolvers, which can identify the rotor position very accurately, are usually used. With knowledge of the rotor position, field-oriented regulation of the synchronous machine can be achieved in rotational speed ranges close to stationary and across the entire operating range of the engine.

However, resolvers together with associated electronics are expensive and sensitive. Sensorless solutions, in contrast, function only to a limited extent: the combination of a synchronous machine with an internal combustion engine without its own starter, which is intended to be cranked up by the synchronous machine for starting, thus poses additional demands. In this case, the highly fluctuating torque also appears in the cylinders due to the compression, wherein in each case peaks in the countertorque arise only temporarily. In many cases, this prevents successful purely controlled run-up.

A similar problem is sensorless operation of piston compressors using a PMSM. Conventional sensorless methods, for example the estimation of the rotor position by an observer model in addition to field-oriented regulation of the synchronous machine, typically deliver sufficiently accurate information for stable field-oriented regulation of the synchronous machine up to the rated torque only for rotational speeds from about 10% of the maximum rotational speed.

In the case of lower rotational speeds, sensorless estimation of the rotor position is difficult or impossible on account of the only low induced voltage. In these rotational speed ranges, the instantaneous rotor position can be identified to a certain degree of accuracy at certain times by suitable test pulses, but this is insufficient in most cases. The torque-generating current also has to be switched off during the test pulses.

A purely controlled run-up in a rotational speed range in which the estimation of the rotor position functions sufficiently accurately by an observer model is problematic. The torque that can be achieved in this operating range is usually only a fraction of the normal rated torque of the engine, since, even at low countertorques, "tilting" of the engine cannot be avoided and hence the torque immediately drops. Targeted setting of the torque is likewise not possible in this operating mode. For applications with low countertorques at low rotational speeds, this is sufficient in individual cases at best.

SUMMARY AND DESCRIPTION

It is therefore the object to provide an improved synchronous machine module. It is a further object to provide an improved vehicle drive and an improved vehicle. In particular, the vehicle drive is intended to be able to be designed in a robust and compact manner.

The synchronous machine module according to an embodiment has a synchronous machine and a rotational speed controller for controlling a rotational speed of the synchronous machine. The rotational speed in electromotive operation of the synchronous machine is naturally controlled by appropriate electrical energization, typically of a stator. The rotational speed controller has a detector for detecting a variable formed by the active power of the synchronous machine or dependent thereon. The rotational speed controller is designed to set the rotational speed of the synchronous machine and/or the time profile thereof depending on the detected variable and/or the time profile thereof.

The sensorless run-up of a permanent-magnet synchronous machine (PMSM), which is normally realized using a purely controlled rotational speed ramp, is decelerated or accelerated with the aid of the easily determinable instantaneous active power in such a way that the load peaks do not lead to "tilting" of the engine.

The synchronous machine module according to one embodiment can subsequently be designed in a simple, robust and compact manner since additional installation space for the sensor can be omitted. Furthermore, the synchronous machine module can therefore be designed in a cost-effective and reliable manner.

In the synchronous machine module according to one embodiment, the time profile of the rotational speed preferably includes at least the change in rotational speed over time. In particular, the term time profile of the rotational speed includes an increase in a rotational speed ramp over time.

In the synchronous machine module in accordance with another embodiment, the rotational speed control device is preferably designed to reduce the change in rotational speed over time when the active power increases and/or is designed to increase the change in rotational speed over time when the active power decreases.

In a preferred embodiment, in the synchronous machine module, the detector is for measuring the phase currents of the synchronous machine and/or for detecting a rotational field frequency of the synchronous machine. The instantaneous active power of the synchronous machine can be easily determined by the phase currents and the set space vectors. Detectors for measuring the phase currents are typically provided in synchronous machines anyway for the purpose of regulating the machine, with the result that, advantageously, no additional outlay in terms of apparatus is incurred with respect to these detectors.

In an advantageous development of the synchronous machine module according to one embodiment, the detectors have a high-pass filter, which is used to filter out DC components of the variable, in particular at a cut-off frequency between 0.5 and 5 Hz. In this case, filtered out means that said DC components are omitted from further signal processing and are not used any further. Only the appropriate high-frequency signal is used subsequently.

In accordance with the embodiment, the speed of said run-up of the internal combustion engine, that is to say the change in rotational speed over time, is decelerated or accelerated using said high-pass-filtered torque signal by way of an adjustable gain. That is to say that the rate of rise of the rotational speed ramp is decelerated when the active power that has to be raised by the engine increases (countertorque increases), and is accordingly accelerated when the active power decreases (countertorque decreases). The rotor is therefore given the opportunity to follow the prescribed stator field.

In the synchronous machine module according to one embodiment, the synchronous machine preferably is or includes a Wankel engine.

The vehicle drive according to one embodiment has a synchronous machine module as described above and includes a current generator, which is connected to the synchronous machine module to energize said synchronous machine module.

In an advantageous development, the vehicle drive according to one embodiment includes an internal combustion engine to which the synchronous machine module is connected for the run-up or start of the internal combustion engine.

In the vehicle drive according to one embodiment, for the case of operation, the internal combustion engine is expediently designed for mechanically energizing the synchronous machine operated by a generator.

The vehicle drive according to one embodiment is preferably designed as a hybrid-electric vehicle drive.

The vehicle in accordance with one embodiment is, in particular, an aircraft. The vehicle has a vehicle drive as described above and/or a synchronous machine module as described above. The vehicle can thus be designed in a simple, robust and compact manner.

The aircraft is expediently an electric aircraft and, in particular, the aircraft drive is a hybrid drive, preferably having a Wankel engine. In accordance with one embodiment, a purely controlled run-up of the internal combustion engine is possible.

BRIEF DESCRIPTION OF THE DRAWINGS

The invention will be explained in more detail below with reference to an exemplary embodiment illustrated in the drawings.

In the drawings.

DETAILED DESCRIPTION

Figure 1:
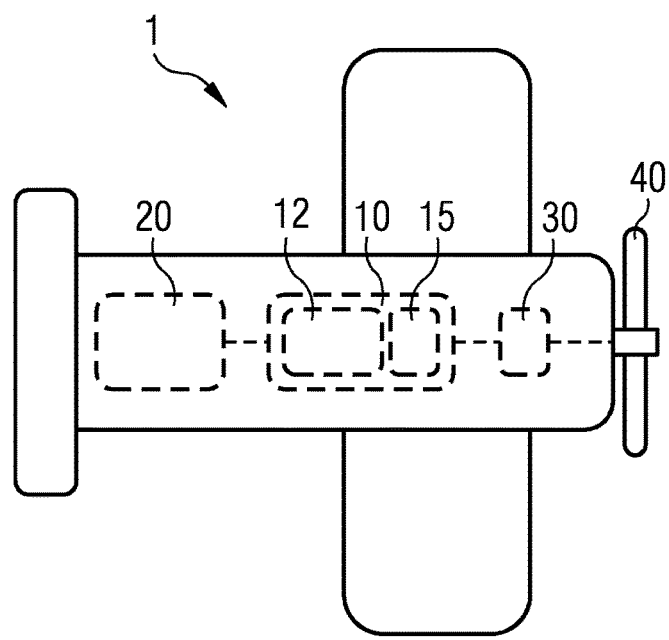
FIG. 1 shows an aircraft according to one embodiment operated in a hybrid-electric manner having a synchronous machine module.

The vehicle according to the embodiment illustrated in FIG. 1 is a hybrid-electric aircraft 1.

The hybrid-electric aircraft 1 has a hybrid-electric drive, which includes a synchronous machine module 10 having a permanent-magnet synchronous machine 12 and a rotational speed controller 15 as described below. An internal combustion engine 20 is connected to the drive side of the synchronous machine module 10, said internal combustion engine burning fuel in the state of continuous operation of the aircraft 1 and providing kinetic energy in the form of a rotating shaft in a manner known per se. The rotating shaft is connected to the synchronous machine 12 of the synchronous machine module 10. The synchronous machine 12 is operated in the state of continuous operation by a generator, that is to say the synchronous machine 12 converts the mechanical kinetic energy of the rotating shaft to electrical energy. An electric motor 30 is energized by the electrical energy of the synchronous machine 12, said electric motor causing a propeller 40 of the aircraft 1 to rotate in the illustrated case.

In principle, additionally or else alternatively, the electrical energy provided can be used to operate another load in further exemplary embodiments, which are not illustrated specifically.

However, for the run-up of the internal combustion engine, the synchronous machine 12 is not operated as an electrical generator, but instead functions as an electric motor, which runs up the internal combustion engine 20, in the exemplary embodiment shown as a Wankel engine. In other exemplary embodiments that otherwise correspond to the illustrated exemplary embodiment, the internal combustion engine 20 can be another internal combustion engine instead of a Wankel engine.

Figure 2:
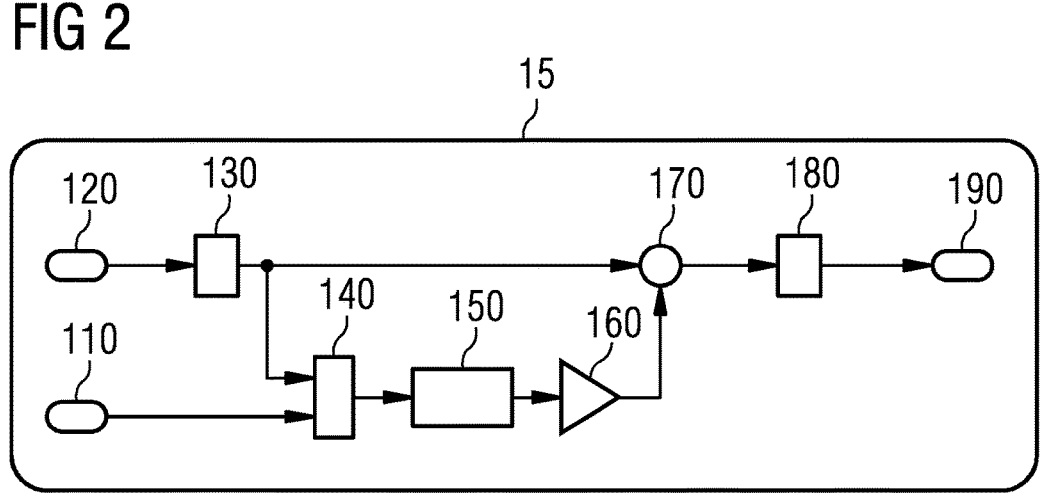
FIG. 2 shows a basic outline of a rotational speed controller of the synchronous machine module of the aircraft in accordance with FIG. 1.

To run up the internal combustion engine 20, the synchronous machine 12 draws electrical energy, for example from an electrical battery (not shown specifically) of the aircraft 1, and rotates the shaft to run up or start the internal combustion engine 20. To this end, the synchronous machine 12 itself has to be run up using a corresponding counter-torque. The rotational speed controller 15 serves to run up the synchronous machine 12. The rotational speed controller 15 of the synchronous machine module 10 is designed to control the rotational speed of the magnetic stator field of the synchronous machine 12 and hence the rotational speed of the shaft and the functioning thereof is shown in FIG. 2.

The rotational speed controller or control device 15 has a detector for detecting a variable formed by the active power or dependent thereon, wherein the rotational speed controller 15 is designed to set the rotational speed of the synchronous machine 12, that is to say the rotational speed of a rotor of the synchronous machine 12 and hence the rotational speed of the shaft rotated with the aid of the synchronous machine 12, and/or the time profile of said rotational speed depending on the detected variable and/or the time profile thereof, as explained below.

To this end, in the exemplary embodiment shown, the rotational speed controller 15 has, on the one hand, ammeters 110, which measure the phase currents that energize the synchronous machine 12 during electromotive operation. The measurement of phase currents by the ammeters 110 is known per se and is established for the regulation of synchronous machines 12. By the measured phase currents and the set space vector, in the present case, the active power of the synchronous machine 12 is also determined in accordance with one embodiment by a computation module or processor 140.

The rotational speed control device 15 also includes the change 120 in rotational speed over time currently provided by the rotational speed controller 15, said change forming the manipulated variable in the present case. The present rotational speed of the synchronous machine can be determined from the time profile of the change 120 in rotational speed over time by integration over time of said time profile. To this end, the signal corresponding to the change 120 in rotational speed over time is transmitted to an integrator circuit 130, which emits a signal corresponding to the instantaneous rotational speed.

The quotient of the present active power and the present rotational speed delivers the present torque, which the motor has to raise for operation. The quotient of the present active power and the present rotational speed is likewise determined by the computation module or processor 140, which receives the present rotational speed as an input variable for this purpose. The present torque determined in this way is purged of DC components by a high-pass filter 150, which has a cut-off frequency of 2 Hz in the illustrated exemplary embodiment. In principle, in further exemplary embodiments not shown specifically, the cut-off frequency may deviate from 2 Hz; however, the cut-off frequency is expediently (although not absolutely necessarily) at least in the same order of magnitude. This torque filtered in this way is now amplified using an amplifier 160 and forms a reference variable for the change in rotational speed over time. To this end, the filtered and amplified torque is provided with a dimensional proportionality factor and is subtracted from the rotational speed signal by a differentiator 170. That is to say, when the active power that the synchronous machine 12 has to raise, hence the counter-torque, increases, the rotational speed is reduced. In contrast, when the active power decreases, the rotational speed is increased by the differentiator 170.

The change in rotational speed over time is controlled in such a way by the filtered torque that, when the active power that the internal combustion engine 20 has to raise increases, that is to say when the countertorque counter to which the internal combustion engine 20 has to work increases, the change 120 in rotational speed over time is reduced and, in contrast, when the active power decreases, the change 120 in rotational speed over time is increased. In this way, a rotor of the synchronous machine 12 can follow the energized field of a stator of the synchronous machine 12. The synchronous machine 12 can be run up or started by said increase or reduction in the change 120 in rotational speed over time in such a way that load peaks do not lead to "tilting" of the internal combustion engine 20.

The rotational speed control device is designed to run up the magnetic stator field by a ramp, that is to say by a linearly increasing rotational frequency.

Although the invention has been illustrated and described in detail by the preferred exemplary embodiment, it is not limited by the disclosed examples and a person skilled in the art can derive other variations here from without departing from the scope of the invention. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

The invention claimed is:

1. A synchronous machine module comprising:
   a synchronous machine; and
   a rotational speed controller for controlling a rotational speed of the synchronous machine, the rotational speed controller comprising a detector for detecting a variable formed by an active power of the synchronous machine or dependent on the active power,
   wherein the rotational speed controller is configured to set the rotational speed of the synchronous machine based on the variable, and
   wherein the rotational speed controller is configured to reduce a change in the rotational speed when the active power increases or increase the change in the rotational speed when the active power decreases.

2. The synchronous machine module as claimed in claim 1, wherein the rotational speed controller is configured to reduce the change in the rotational speed over time when the active power increases or increase the change in rotational speed over time when the active power decreases.

3. The synchronous machine module as claimed in claim 2, wherein the detector comprises an ammeter for measuring phase currents of the synchronous machine, an integrator circuit for detecting a rotational field frequency of the synchronous machine, or a combination thereof.

4. The synchronous machine module as claimed in claim 3, wherein the detector comprises a high-pass filter to filter out DC components of the variable.

5. The synchronous machine module as claimed in claim 2, wherein the detector comprises a high-pass filter to filter out DC components of the variable.

6. The synchronous machine module as claimed in claim 1, wherein the detector comprises an ammeter for measuring phase currents of the synchronous machine, an integrator circuit for detecting a rotational field frequency of the synchronous machine, or a combination thereof.

7. The synchronous machine module as claimed in claim 6, wherein the detector further comprises a high-pass filter to filter out DC components of the variable.

8. The synchronous machine module as claimed in claim 1, wherein the detector comprises a high-pass filter to filter out DC components of the variable.

9. The synchronous machine module as claimed in claim 8, wherein the high-pass filter has a cut-off frequency between 0.5 and 5 Hz.

10. The synchronous machine module as claimed in claim 1, wherein the synchronous machine is a Wankel engine.

11. A vehicle drive comprising:
    a synchronous machine module comprising:
      a synchronous machine; and
      a rotational speed controller for controlling a rotational speed of the synchronous machine, the rotational speed controller comprising a detector for detecting a variable formed by an active power of the synchronous machine or dependent on the active power, wherein the rotational speed controller is configured to set the rotational speed of the synchronous machine based on the variable, and wherein the rotational speed controller is configured to reduce a change in the rotational speed when the active power increases or increase the change in the rotational speed when the active power decreases; and
    a current generator connected to the synchronous machine module to energize the synchronous machine module.

12. The vehicle drive as claimed in claim 11, further comprising:
    an internal combustion engine mechanically connected to the synchronous machine module to energize the synchronous machine module.

13. The vehicle drive as claimed in claim 12, wherein the internal combustion engine and the synchronous machine comprise a hybrid-electric vehicle drive.

14. An aircraft comprising:
a synchronous machine module comprising:
   a synchronous machine; and
   a rotational speed controller for controlling a rotational speed of the synchronous machine, the rotational speed controller comprising a detector for detecting a variable formed by active power of the synchronous machine or dependent on the active power, wherein the rotational speed controller is configured to set the rotational speed of the synchronous machine based on the variable, and wherein the rotational speed controller is configured to reduce a change in the rotational speed when the active power increases or increase the change in the rotational speed when the active power decreases; and
a current generator connected to the synchronous machine module to energize the synchronous machine module.

15. The aircraft as claimed in claim 14, further comprising:
   an internal combustion engine mechanically connected to the synchronous machine to energize the synchronous machine.

16. The aircraft as claimed in claim 15, wherein the internal combustion engine and the synchronous machine comprise a hybrid-electric vehicle drive.

* * * * *